United States Patent
Daly et al.

(12)

(10) Patent No.: US 11,735,074 B2
(45) Date of Patent: Aug. 22, 2023

(54) SYSTEM AND METHOD FOR A RETRACTABLE REEL SAFETY FLAGS ON A STRAP

(71) Applicant: Fallswood, LLC, Seabrook, TX (US)

(72) Inventors: Daniel Patrick Daly, Friendswood, TX (US); Jeffrey Cole Sandel, Seabrook, TX (US)

(73) Assignee: Fallswood, LLC, Seabrook, TX (US)

( * ) Notice: Subject to any disclaimer, the term of this patent is extended or adjusted under 35 U.S.C. 154(b) by 1220 days.

(21) Appl. No.: 16/280,813

(22) Filed: Feb. 20, 2019

(65) Prior Publication Data
US 2019/0259315 A1      Aug. 22, 2019

Related U.S. Application Data

(60) Provisional application No. 62/632,424, filed on Feb. 20, 2018.

(51) Int. Cl.
G09F 17/00      (2006.01)
G01L 5/04       (2006.01)
(Continued)

(52) U.S. Cl.
CPC ......... G09F 17/00 (2013.01); B65H 75/4402 (2013.01); B65H 75/4471 (2013.01);
(Continued)

(58) Field of Classification Search
CPC ............. G09F 17/00; G09F 2017/0083; B65H 75/4402; B65H 75/4471; B65H 75/4484;
(Continued)

(56) References Cited

U.S. PATENT DOCUMENTS 1,560,906 A * 11/1925 Finlay ................. G09F 21/10
                                                                  40/214
1,769,500 A * 7/1930 Fisher .................. B63C 9/20
                                                                  340/815.74
(Continued)

FOREIGN PATENT DOCUMENTS

CN      109473052 A   *  3/2019
DE        0534349 A2  *  3/1993
(Continued)

*Primary Examiner* — John Fitzgerald
*Assistant Examiner* — Tania Courson
(74) *Attorney, Agent, or Firm* — G. Michael Roebuc, PC

(57) ABSTRACT

In a particular illustrative embodiment of the present invention, a retractable safety banner system and method are disclosed having a retractable safety banner, a reel housing and a reel. The reel winds in and contains the wound up safety banner inside of the reel housing. The safety banner is reeled into and out of the reel housing through an organizing guide that is formed in the reel housing. The organizing guide forces the reeled out safety banner's flags and strap into longitudinal alignment on the reel so that the safety banner is restored to its original configuration when wound back into the reel housing after deployment. The safety banner includes but is not limited to longitudinal strap with a plurality of safety flags attached to the strap and so that the flags hang at a substantially perpendicular angle from the strap forming the safety banner when the safety banner is deployed.

14 Claims, 10 Drawing Sheets

(51) Int. Cl.
   *B65H 75/44* (2006.01)
   *G08B 13/12* (2006.01)
   *H04N 7/18* (2006.01)

(52) U.S. Cl.
   CPC .......... *B65H 75/4484* (2013.01); *G01L 5/047* (2013.01); *G08B 13/12* (2013.01); *B65H 2515/31* (2013.01); *B65H 2701/374* (2013.01); *G09F 2017/0083* (2013.01); *H04N 7/188* (2013.01)

(58) Field of Classification Search
   CPC .......... B65H 2515/31; B65H 2701/374; G01L 5/047; G08B 13/12; G08B 13/19613; G08B 25/08; H04N 7/188
   See application file for complete search history.

(56) References Cited

U.S. PATENT DOCUMENTS

| | | | | |
|---|---|---|---|---|
| 1,857,415 | A * | 5/1932 | Udet | F41J 9/10 |
| | | | | 40/215 |
| 2,923,917 | A * | 2/1960 | McPherson et al. | B64D 25/20 |
| | | | | 116/210 |
| 4,606,485 | A * | 8/1986 | Rankin | B65H 35/0006 |
| | | | | 225/82 |
| 4,770,495 | A * | 9/1988 | Lees | E01F 13/02 |
| | | | | 359/534 |
| 4,844,420 | A | 7/1989 | Oster | |
| 5,244,715 | A | 9/1993 | Kuchar | |
| 5,484,137 | A * | 1/1996 | Smith | E01F 9/70 |
| | | | | 116/202 |
| 5,501,429 | A * | 3/1996 | Sakuma | E01F 13/028 |
| | | | | 256/45 |
| 6,142,701 | A * | 11/2000 | Falcon | E01F 13/028 |
| | | | | 404/9 |
| 6,754,974 | B2 * | 6/2004 | Bassolino | A63B 67/068 |
| | | | | 33/1 G |
| 6,782,653 | B1 * | 8/2004 | Thomas | A01M 31/06 |
| | | | | 43/2 |
| 6,969,050 | B1 * | 11/2005 | Loebner | E01F 13/028 |
| | | | | 49/34 |
| 6,969,185 | B1 | 11/2005 | Adair | |
| 7,125,597 | B2 * | 10/2006 | Kuchar | D04B 9/00 |
| | | | | 116/173 |
| 7,380,375 | B2 * | 6/2008 | Maly | B65G 69/2882 |
| | | | | 340/541 |
| 7,467,062 | B2 * | 12/2008 | Stiner | G01G 19/60 |
| | | | | 702/173 |
| 7,538,688 | B1 | 5/2009 | Stewart | |
| 7,802,605 | B2 * | 9/2010 | Prismall | E01F 13/028 |
| | | | | 160/24 |
| 7,909,310 | B2 * | 3/2011 | Weiner | E04H 12/2215 |
| | | | | 256/45 |
| 8,707,595 | B2 | 4/2014 | Beemsterboer | |
| 8,777,512 | B2 * | 7/2014 | Henderson | E01F 13/02 |
| | | | | 116/63 P |
| 8,823,549 | B1 * | 9/2014 | Moone | G08G 1/01 |
| | | | | 116/63 P |
| 8,864,069 | B2 * | 10/2014 | McDonnell | B64D 3/00 |
| | | | | 244/110 G |
| 9,175,450 | B2 * | 11/2015 | Weiner | E01F 13/028 |
| 9,388,541 | B2 * | 7/2016 | Kunkel | E01F 9/654 |
| 9,476,174 | B2 * | 10/2016 | Patterson | E01F 13/028 |
| 9,858,837 | B1 | 1/2018 | Cameron | |
| 9,947,250 | B2 * | 4/2018 | Yang | G09F 27/005 |
| 10,035,677 | B2 * | 7/2018 | Chen | B65H 75/48 |
| 10,458,133 | B2 * | 10/2019 | Davis | E04H 17/00 |
| 10,619,790 | B2 * | 4/2020 | Cuttill | E04G 21/3204 |
| 10,866,333 | B2 * | 12/2020 | Haumonte | G01V 1/3817 |
| 2004/0060499 | A1 * | 4/2004 | Penque, Jr. | E01F 13/028 |
| | | | | 116/63 P |
| 2005/0136215 | A1 * | 6/2005 | Kuchar | D04B 7/02 |
| | | | | 428/136 |
| 2005/0220537 | A1 * | 10/2005 | Bentley | E01F 13/028 |
| | | | | 404/9 |
| 2006/0055559 | A1 * | 3/2006 | Leonard | E01F 13/028 |
| | | | | 340/908.1 |
| 2009/0226252 | A1 * | 9/2009 | Field | E01F 13/028 |
| | | | | 404/6 |
| 2010/0044661 | A1 * | 2/2010 | Weiner | E01F 9/685 |
| | | | | 256/1 |
| 2012/0119907 | A1 * | 5/2012 | Teuchert | G08B 5/006 |
| | | | | 340/541 |
| 2014/0261149 | A1 * | 9/2014 | Amini | G08B 5/002 |
| | | | | 116/210 |
| 2015/0000587 | A1 | 1/2015 | Chaney | |
| 2018/0016801 | A1 | 1/2018 | Davis | |
| 2019/0259256 | A1 * | 8/2019 | Fairweather | E01F 9/654 |
| 2022/0135366 | A1 * | 5/2022 | Thenemann | B65H 75/4486 |
| | | | | 160/24 |
| 2022/0136187 | A1 * | 5/2022 | Thenemann | E01F 13/028 |
| | | | | 49/34 |

FOREIGN PATENT DOCUMENTS

| | | |
|---|---|---|
| EP | 3062303 A1 | 8/2008 |
| FR | 2650105 A1 | 1/1991 |
| KR | 100665665 B1 | 1/2007 |
| WO | 2016181153 A1 | 11/2016 |

* cited by examiner

SYSTEM AND METHOD FOR A RETRACTABLE REEL SAFETY FLAGS ON A STRAP

CROSS REFERENCE TO RELATED PATENT APPLICATIONS

This patent application is based on U.S. Provisional Patent Application 62/632,424 entitled "A system and method for a Retractable Reel Safety Flags on a Strap", filed on Feb. 20, 2018 by Daniel Patrick Daly and Jeffrey Cole Sandel which is hereby incorporated herein in its entirety.

BACK GROUND OF THE INVENTION

The appearance of temporary safety barriers is commonplace in emergencies to separate the public from first responder activities or crime scene investigations and ongoingly dangerous sites that contain hazards such as stored chemicals. Often times these safety barriers are set up ad hoc and consist of the thin "crime scene" tape or some other warning to "keep out," or "construction zone", that we are used to seeing around construction sites and crime scenes in the news.

FIELD OF THE INVENTION

The present invention relates the field of safety barriers and in particular to portable safety barriers.

SUMMARY OF THE INVENTION

In a particular illustrative embodiment of the present invention, a retractable safety banner system and method are disclosed having a retractable safety banner, a reel housing and a reel for winding the safety barrier in and out of the reel housing. The reel winds in the safety banner inside of the reel housing for storage. The safety banner is reeled in and out of the reel housing through an organizing guide that is formed as an opening in the reel housing. The organizing guide forces the reeled out safety banner's flags and strap into longitudinal alignment on the reel so that the safety banner is restored to its original configuration when wound back into the reel housing after deployment. The flags are attached to the strap along sections or intervals along the strap. The flags are wound onto the reel underneath the section of strap to which each of the flags are attached. The safety banner includes but is not limited to longitudinal strap with a plurality of safety flags attached to the strap and so that the flags hang at a substantially perpendicular angle from the strap forming the safety banner when the safety banner is deployed.

DETAILED DESCRIPTION OF AN ILLUSTRATIVE EMBODIMENT

Figure 1:
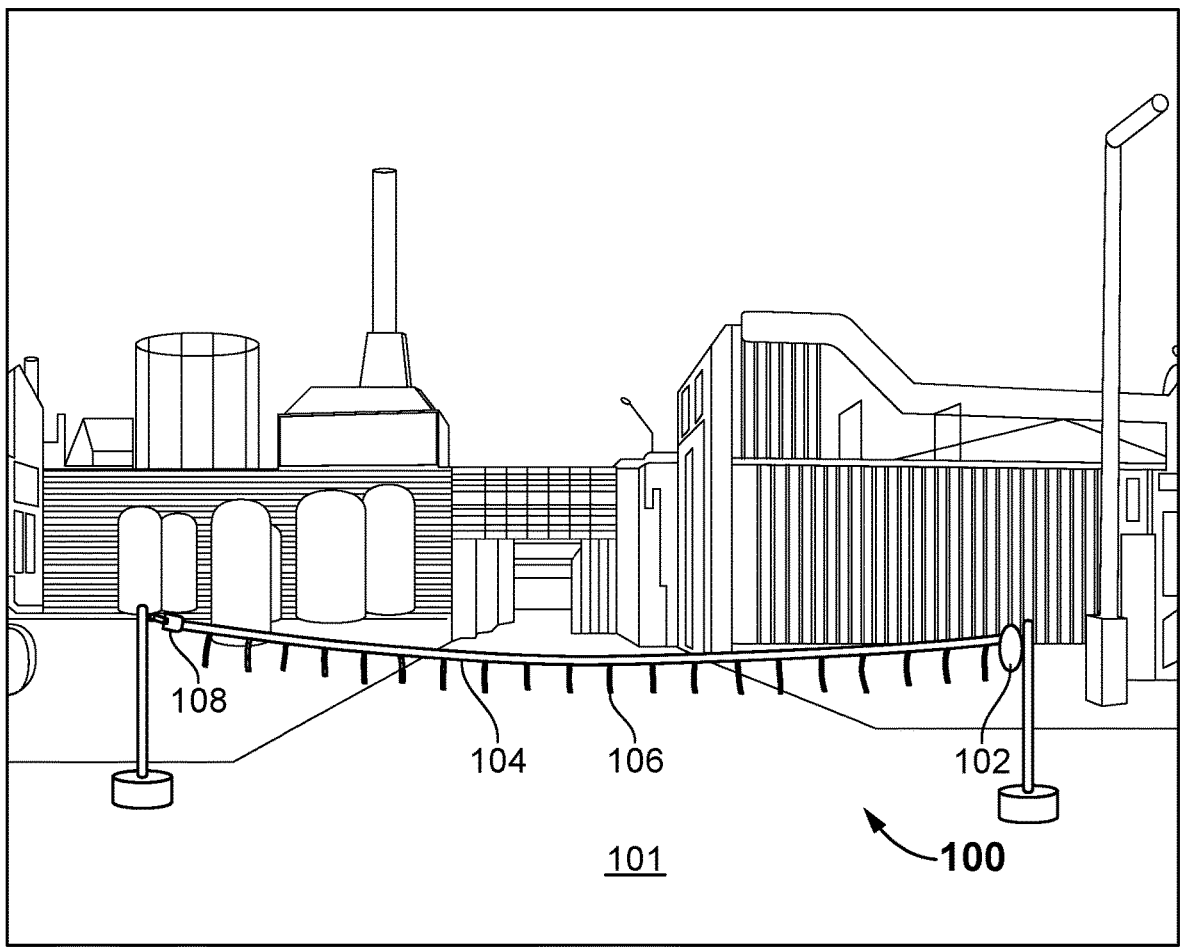
FIG. 1 is schematic depiction of a particular illustrative embodiment of the invention wherein a safety banner is reeled out of a reel housing and deployed across a roadway entrance.

In a particular illustrative embodiment of the invention, the present invention discloses—"A system and Method for a Retractable Reel Safety Flags on a Strap". In a particular illustrative embodiment of the invention, a Retractable Safety banner is disclosed. In another particular illustrative embodiment of the invention, a reel housing is provided the contains a spring loaded reel, wherein the reel consists of spring-loaded reel that releases (reels out) a retractable safety banner. In another particular illustrative embodiment of the invention, a plurality of safety flags are sewn (attached) to a bottom surface of the retractable strap. In another particular illustrative embodiment of the invention, the retractable strap is a 1-inch wide durable mesh polyester webbing. In another particular illustrative embodiment of the invention, the flags are sewn as a hem at a 45-degree angle to the bottom surface of the safety strap at one-foot intervals. In another particular illustrative embodiment of the invention, the safety banner, comprising the safety strap and safety flags, are reeled back onto the spring loaded reel for storage. In another particular illustrative embodiment of the invention, a Tension sensor is attached near to the distal end of the strap to sense tension in the retractable safety strap after it is deployed to enable a processor to sense unauthorized tension events that indicate that a deployed safety banner has been taken down or pushed on or through by a car.

In another particular illustrative embodiment of the invention, the tension sensor sends tension measurements indicating present tension on the deployed safety banner to the processor via a wireless connection. In another particular illustrative embodiment of the invention, the reel housing carries a video camera. The video camera monitors the safety banner as it is deployed, and the video camera is monitored by a central processor to confirm that the banner is deployed at a particular location. In another particular illustrative embodiment of the invention, in the case of unauthorized entry determined by the processor monitoring the tension sensor, activates the video camera. In another particular illustrative embodiment of the invention, an alarm along with the video is transmitted to a security monitor system. In another particular illustrative embodiment of the invention, an electrical light emitting fiber optics wires woven into the retractable flexible strap and safety flags. In another particular illustrative embodiment of the invention, the safety banner emits light to make the safety banner more visible at night. In another particular illustrative embodiment of the invention, after deploying the safety banner, the safety flag hangs vertically from the bottom surface of the strap when the safety banner is deployed horizontally. As the safety banner is reeled back into the reel housing onto the reel, the safety flags and strap pass through the organizing guide and rollers that force the flags and strap to align wherein a longitudinal axis of the strap and the flags align directly on top of each other without overlap on either side of the strap and flags. Each of the flags are sewn at one end to the bottom surface of the strap. The safety banner is wound onto the reel with the flags underneath the length or section of strap to which the flags are sewn. The flags lie flat against the strap when reeled onto the reel for storage. In another particular illustrative embodiment of the invention, the retractable strap is a durable mesh polyester webbing is 1 inch wide, ⅛-inch thick and 50 feet long. In a particular illustrative embodiment of the invention the 50 foot safety banner weighs approximately 1 pound so that the safety banner resists movement in a wind. In a particular illustrative embodiment of the invention the 50 foot safety banner weighs approximately 5 pounds so that the safety banner resists movement in a wind. The durable mesh is also sufficiently stiff, being ⅛ thick, so that the flags resist winding around the safety strap. In another particular illustrative embodiment of the invention, the safety flags are 1-inch wide durable mesh being ⅛ inch-thick and 10 inches long and attached to the strap at 1-foot intervals.

In another particular illustrative embodiment, the reel is spring loaded to bias the reel to rotate counter clockwise to reel the safety banner back onto the reel. When unwinding the safety banner from the reel, the counter clockwise force of the spring loaded reel is overcome by pulling the safety banner off the reel. As the safety banner is pulled and unwound from the spring loaded reel, the spring loaded reel locks in at ratcheted intervals so that once the safety banner is wound off the reel to a desired length across a roadway, the spring loaded reel locks into a short ratcheted interval or approximately 6 degrees rotation so that the spring loaded reel is locked and does not reel the safety banner back onto the reel until the ratcheted lock in is released by pulling on the banner on the reel to release the reel from the ratchet. Once the ratcheted reel lock is overcome by pulling on the safety banner strap, the safety banner strap and flags and is reeled back into the reel housing by the spring loaded reel. The safety banner is deployed with the reel locked into the ratcheted lock in position. The tension meter measures the tension of the safety banner with the reel locked into the ratcheted lock in position to enable the processor to detect and determine a tension event. In a particular illustrative embodiment, a 30-foot length is deployed across a roadway. The 30-foot length of safety banner weighs 1 pound and presents a tension of 1 pound (referred to herein as "droop tension") to the tension meter when the safety banner is deployed across a 30-foot roadway and the reel is ratcheted and locked to prevent the spring loaded reel from reeling the safety banner back into the reel housing. A tension event is detected when the tension is reduced above or below 1 pound, by a programmable percentage of tension for a programmable duration of time, as described below. The tension required to overcome the spring loaded reel is 500% of the droop tension or 5 pounds in this example. Thus applying 5 pounds of pulling force on the safety banner releases the locked reel so that the safety banner is reeled back into the reel housing an onto the reel.

In another particular illustrative embodiment of the invention, an unauthorized entry is monitored by the processor using the tension sensor and a video camera arrangement. In another particular illustrative embodiment of the invention, the processor is connected to camera and sensor via wireless data communication connection. In another particular illustrative embodiment of the invention, a light emitting safety banner is provided that makes the safety banner more visible at night.

In another particular illustrative embodiment of the invention, a system and method are disclosed for a reel housing containing a spring-loaded reel that releases (reels out) a retractable safety banner when the safety banner is deployed and retracts (reels in) the retractable safety banner for storage. In another particular embodiment, the reel is operated by an electric motor to reel in and out the safety banner. In another particular embodiment a tension sensor profile (the tension sensor profile defined by an event tension value and a tension duration value stored in the computer readable medium) for the safety banner tension on the reel to determine unauthorized events such as unauthorized release or removal of the safety banner or safety banner vehicle drive through detection when someone tries to drive through the safety banner. A user pod with a processor is used to program the tension sensor profile tension value and duration value. A security monitoring system is provided to receive alerts from the reel processor along with video of the safety banner deployment.

In another particular embodiment of the invention, the processor monitors the tension sensor in real time to detect a tension event on the deployed safety banner. In a particular embodiment, a tension event is determined as an increase or decrease in the droop tension for a deployed safety banner. In another particular embodiment, a processor determines a tension event has occurred and reacts to the tension event. In a particular embodiment, a tension event is determined as a detected change in droop tension over a duration of time defined as a programmable event duration. For example, in a particular embodiment, a tension event is defined as a change in droop tension of more than 10% droop tension for a duration of 3 seconds. The event tension and event duration are programmable using user pod and the processor so that a particular tension event or multiple tension events are detected by the processor and acted upon by the processor by sending an alert to a security monitoring system, turning on a video camera to view the safety banner deployment and activating a light illumination the safety banner deployment. For example, an unauthorized entry event or "tension event" is detected by setting tension event time (also referred to herein as "duration") at 2 seconds and the event tension as a decrease of 15% of droop tension on the deployed safety banner. A drive through event when a car presses against the safety banner or drives though can be detected by setting the even duration at 3 seconds and the event tension as a 50% increase in droop tension on the safety banner. In a particular illustrative embodiment, the processor, determines a tension event has occurred when a loss of tension event occurs and sends an alert to a security monitor when the loss of tension event occurs. In another particular embodiment of the invention, a loss of tension event is detected by the processor and which sends an alert when the tension is reduced by 10% of a steady state tension ("droop tension") determined by the processor after the banner is deployed. The steady state tension or "droop tension", is the tension monitored by the processor and measured by the tension sensor while the safety banner is deployed for 5 seconds with the reel in a locked ratcheted interval. In another particular embodiment, the droop tension measurement time of 5 seconds is programmable for longer or shorter times. The event tension for a loss of tension event is programmable from 10% to 90% of the droop tension, to enable a user to set the event tension for a particular event, such as unauthorized detachment of the safety banner, which reduces the droop tension. In another embodiment of the invention, the processor monitors the tension sensor a loss of tension event and turns on the video camera when a loss of tension event occurs.

In another embodiment of the invention, the processor monitors the tension sensor for an increase of tension event and sends an alert to a security monitor when an increase tension event occurs. An increase of tension event is detected by the processor, which then sends an alert to a security monitoring system, when the tension is increased by 10% of steady state tension (droop tension) determined by the processor after the banner is deployed. The alert tension (event tension) for an increase of tension event is programmable from 10% to 90% to enable a user to set the alert tension (the increase of tension above the droop tension which causes the processor to send an alert and react to the tension event). In another embodiment of the invention, the processor monitors the tension sensor an increase of tension event and turns on the video camera when an increase of tension event occurs. An increase of tension event occurs when the tension of the tension monitor goes above the alert tension for an increase of tension event when an authorization code has not been sent to the reel processor.

In another illustrative embodiment of the invention, a tension event occurs and is detected when a loss of tension event occurs. A loss of tension event occurs when the tension of the tension monitor goes below the alert tension for a loss of tension event when an authorization code has not been sent to the reel processor. In another illustrative embodiment of the invention, an increase of tension event occurs when the tension of the tension monitor goes the alert tension for an increase of tension event when an authorization code has not been sent to the reel processor.

In another particular embodiment of the invention a user control pod, having a user processor and wireless transmitter is provided to provide an authorization code to a reel processor in the reel housing. The reel processor accepts commands from the user processor and reports incidents to a security monitoring system, when a camera or tension sensor on the reel detects that unauthorized events occur on safety banner to prevent tampering with the safety banner. In a particular embodiment of the invention, the safety banner comprises safety flags sewn to a retractable flat mesh strap also referred to herein as a "strap" and "flexible strap". The safety flags are attached to the bottom surface of the retractable strap. A reel is provided in the reel housing to reel the retractable safety banner in and out. The retractable safety banner is reeled out for deployment and reeled in for storage. The safety banner is reeled out of the reel housing and off of the reel when the safety banner is deployed across an area, such as a roadway entrance, to provide a visual and physical safety barrier. The deployed retractable safety banner serves as a visible and physical indication of a safety barrier to prevent entry into a road accessible through the road way entrance. The retractable strap in one particular embodiment of the invention is a 1-inch wide durable mesh polyester webbing, the polyester webbing being, ⅛-inch thick and 50-feet long. The safety flags are 1-inch wide durable mesh being 1-inch wide, ⅛ inch-thick and 10 inches long. A flag lying on a section of the strap has a combined thickness of ¼ inch and is one inch wide. Thus, when the safety banner is reeled in, the 10 inch flags are wound onto the reel without over lapping each other as they are wound onto the reel under 12-inch sections of strap to which the flags are attached.

Each of the safety flags are sewn on a first, upper end of each of the flags to the strap at 1-foot intervals. In a particular illustrative embodiment, the deployed safety banner comprises a 30-foot length of a 50-foot retractable safety banner strap that is reeled off of the reel and out of the reel housing so that the safety banner is deployed with the bottom surface facing down, horizontal and parallel to a roadway surface so that the flags hang down from the bottom side of the strap and perpendicular to the horizontal strap. The distal end of the safety banner is attached to a vertical support pole on one side of the roadway and the reel housing is attached to a vertical support pole on an opposite side of the roadway. In a particular embodiment of the invention, the 30 length of deployed safety banner, having ten-inch long safety flags sewn to the safety strap at 1-foot intervals, hangs horizontally across the roadway and the safety flags hang from the safety strap at an angle perpendicular to the safety strap and parallel to the support poles. The safety banner is reeled off of the reel and out of the reel housing to provide an adjustable length safety banner. In one embodiment of the invention, the reel housing attaches to a vertical pole on one side of a roadway at a height of 3 feet. The safety banner is deployed as it is pulled out of the reel housing and unwound off of the reel and attached to a vertical pole on an opposite side of the roadway by a hook attached to a distal the end of the safety banner. The safety banner comprising the safety strap and safety flags are reeled back onto the reel by the spring loaded reel for storage after deployment.

Each of the flags are stitched to the bottom surface of the strap at one end to the strap at a 45-degree angle so that each of the flags pivots down along the 45-degree angled stitch, from the strap at a 90-degree downward angle when the strap is horizontally deployed. Each of the flags pivots back along the 45-degree angled stitch pivots back to align horizontally with the strap when the safety flag is reeled back in. The 45-degree stitching of each flags to the strap, urges each of the flags in a downward direction perpendicular to a horizontally deployed strap. During manufacture of the safety banner, each flag is 10-inches long is placed at 1 foot intervals along the longitudinal axis of the strap and on a bottom side of the strap. Each of the 10-inch flags has an upper end and lower end. The upper end of each flag is sewn to the bottom side of the strap at 1-foot intervals using a stitch at a 45-degree angle stitch relative to a longitudinal axis of a longitudinally aligned flags and strap. The mess straps and flags are heavy enough so that the flags will not blow easily in winds or a breeze and resists the flags from wrapping around the strap forming the safety banner in a wind burst. In a particular embodiment, the flags, the heavy mesh flags also fold back along the 45-degree angled stitch and parallel to the strap along its longitudinal axis, when the safety banner made up of the strap and flags is reeled back onto the reel though an opening in the reel housing so that the safety banner flags are aligned along the longitudinal axis of the strap so that the safety banner is returned to the original configuration of the stored safety banner on the reel, as the safety banner was positioned before deployment, for compact and orderly storage on the reel and easy deployment and reuse of the safety banner.

The flags and strap are reeled in and organized neatly onto the reel by feeding the strap and flags through an organizing guide formed in the reel housing, wherein the organizing guide has an opening through which the flags and strap pass when being reeled in. The flags and strap pass between two rollers, one roller at each end of the organizing guide. The organizing guide longitudinally aligns the flags and strap so that the flags lay flat on the reel underneath the section of strap to which the flag is attached. In another particular illustrative embodiment of the invention, an opening in the organizing guide in the safety reel is that receives the safety banner when the safety banner is reeled in and out is 20% wider than then width of the safety banner. During reeling in of the safety banner, the dimensions of the opening in organizing guide and rollers at each end of the organizing guide in the reel housing forces the flags to align with the strap on safety banner to compactly reel onto the reel for storage with the width of the flags directly aligned longitudinally with the width of the strap on the reel.

In another particular embodiment of the invention, the opening in the safety reel is that receives the safety banner when the safety banner is reeled in and out is 10% wider than the combined thickness of the strap and an attached and 10% longer than then width of the safety banner. In another particular embodiment of the invention, the opening in the safety reel is that receives the safety banner when the safety banner is reeled in and out is 30% wider than the combined thickness of the strap and an attached and 30% longer than then width of the safety banner. In another particular illustrative embodiment of the invention, the organizing guide is 10% wider than the width of the flags and strap and is open between the two rollers through which the safety banner passes into and off of the reel. In another particular illustrative embodiment of the invention, the organizing guide is 10% wider than the width of the flags and strap and is open a length of 3 inches between the two rollers through which the safety banner passes into and off of the reel.

In another illustrative embodiment of the invention, the 10-inch flags are sewn at a 90-degree angle relative to the longitudinal axis of the strap at 1-foot intervals along the strap. In another illustrative embodiment of the invention, the 10-inch flags are sewn at one end at an angle parallel to the longitudinal axis of the strap at 1-foot intervals along the strap. In another illustrative embodiment of the invention, the 10-inch flags are sewn at one end at an angle perpendicular to the longitudinal axis of the strap at 1-foot intervals along the strap.

In another illustrative embodiment of the invention, a processor with a computer readable medium and wireless communication port, is provided in the reel housing. A tension sensor is attached to the reel to sense tension on the safety strap in the reel an "unauthorized entry event" when the safety banner is disturbed by unauthorized detachment and/or entry by detaching or lifting of the banner to allow a vehicle to pass under the safety banner to enter the roadway where the safety banner is deployed blocking entry into the roadway. In another embodiment of the invention, a video camera is provided in the reel housing. In another embodiment a tension sensor is attached to near the distal end of the strap to sense tension in the retractable safety strap. In another embodiment of the invention, the tension sensor has a WIFI transmitter/receiver to send tension measurements to the processor in real time. In another embodiment of the invention, the tension sensor has a WIFI transmitter/receiver to send tension measurements to the processor in 30 millisecond intervals. Wi-Fi is the name of a popular wireless networking technology that uses radio waves to provide wireless high-speed Internet and network connections.

In another embodiment a tension sensor is attached to near reel to sense tension in the retractable safety strap during deployment. The tension sensor sends tension measurements indicating tension of the deployed safety banner to the reel processor via a wireless connection. In another embodiment the tension sensor is attached to the distal end of the strap to sense tension in the deployed safety banner. The tension sensor activates the video camera when an unauthorized entry event occurs. In another embodiment an alarm along with the video is transmitted to a security monitor. The camera and additional cameras are also monitored by a central security system processor to confirm that the banner is deployed properly at a particular location.

In another embodiment, the safety banner emits light to make the safety banner more visible at night. In one embodiment the processor senses when the strap is deployed and provides power to electrical light emitting fiber optics wires woven into the retractable flexible strap and safety flags. The flags are sewn as a hem at a 45-degree angle to the safety strap at one-foot intervals and so that the safety flags hang vertically when the safety banner is deployed horizontally and fold along the hem as the safety banner is reeled in so that the safety flags align with a longitudinal axis of the strap and lie flat against the strap when reeled in on the reel for storage. In another embodiment of the invention, the reel housing is powered by a battery. In another embodiment of the invention, the reel housing is powered by an alternating current power supply.

Turning now to FIG. 1 is schematic depiction of a particular illustrative embodiment 100 of the invention wherein a safety banner is reeled out of a reel housing through a reel house and deployed across a roadway entrance 101. As shown in FIG. 1, a safety banner is deployed between two poles to block an entrance to a roadway in an industrial area. A reel housing 102 is attached to a first pole. A distal end of the safety banner is attached to a second pole by a hook 108 fixed to the distal end of the safety banner. The safety banner includes but is not limited to a horizontally deployed strap 104 and a plurality of perpendicularly dispose flags 106.

Figure 2:
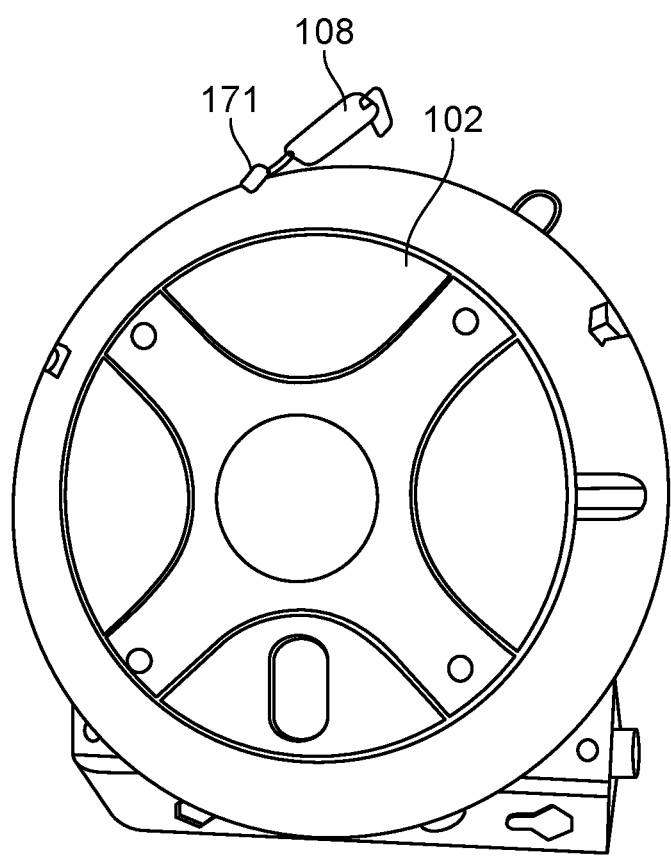
FIG. 2 is schematic depiction of a particular illustrative embodiment of the invention showing a reel housing wherein a safety banner is reeled in for storage.

Turning now to FIG. 2 is schematic depiction of a particular illustrative embodiment of the invention showing a reel housing wherein a safety banner is reeled in for storage. As shown in FIG. 2, the reel housing 102 stores the safety banner when the safety banner is not deployed. The distal end 108 of the safety banner is exposed and protrudes from the reel housing. The safety banner is deployed by pulling on the distal end to unwind the safety banner from the reel inside of the reel housing. The safety banner passes through an opening provided by an organizing guide 171, shown more detail below as discussed in relation with FIG. 6B.

Figure 3:
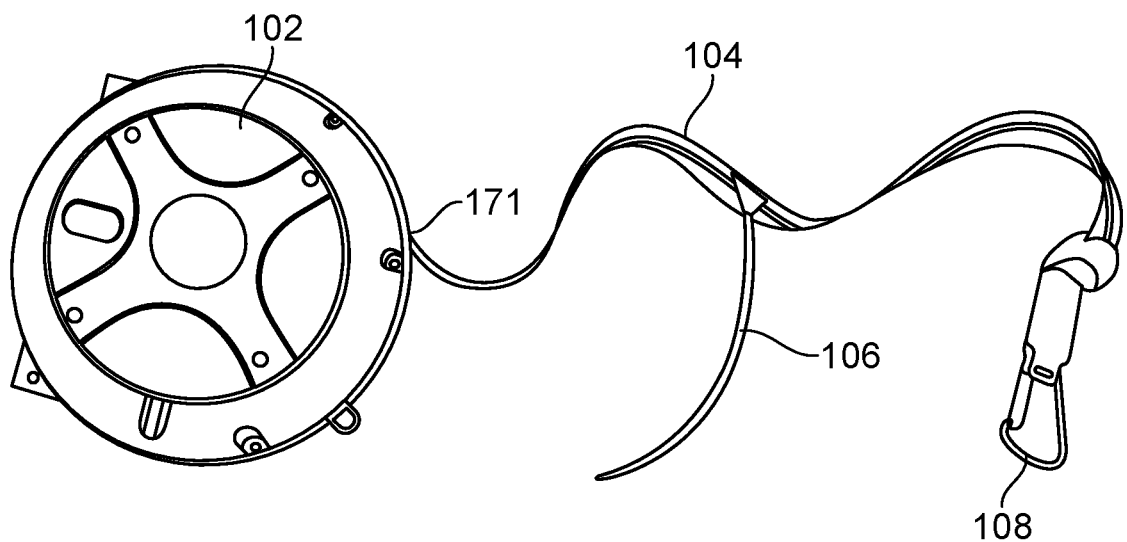
FIG. 3 is schematic depiction of a particular illustrative embodiment of the invention showing a reel housing with a safety banner reeled partially off of the reel and out of the reel housing, wherein the safety banner comprises a strap and a plurality of flags attached to the strap and a hook attached to the distal end of the safety banner.

Turning now to FIG. 3 is schematic depiction of a particular illustrative embodiment of the invention showing a reel housing 102 with a safety banner reeled partially off of the reel 110 and out of the reel housing, wherein the safety banner comprises a strap 104 and flags 106 attached to the strap and a hook 108 attached to the distal end of the safety banner.

Figure 4:
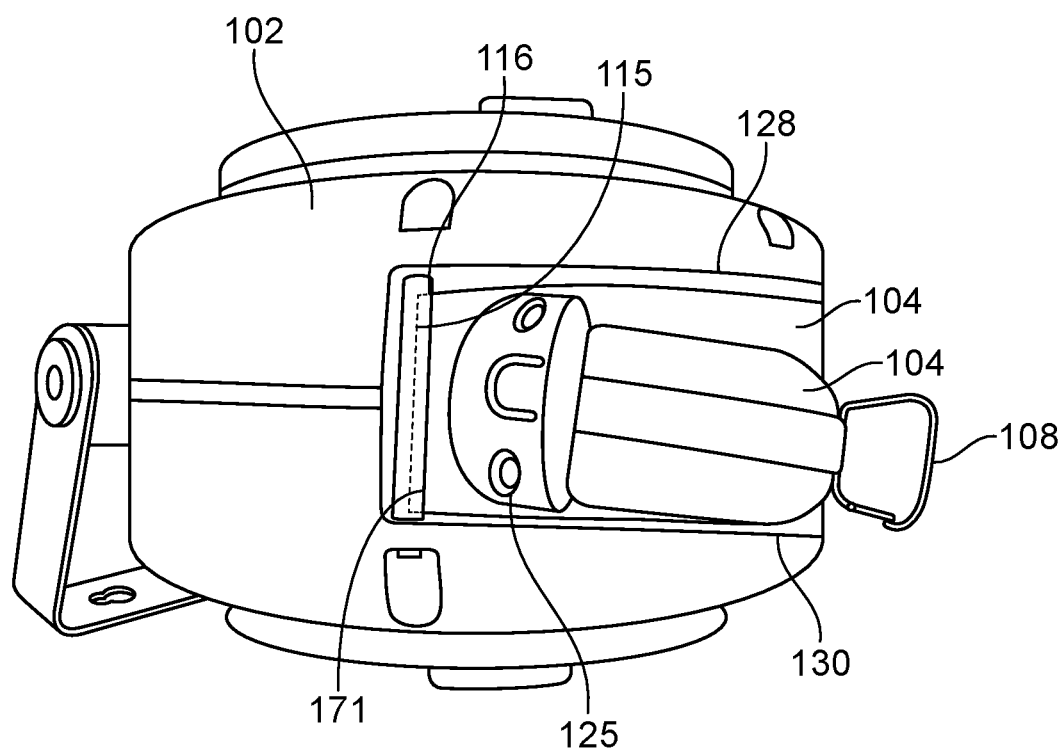
FIG. 4 is schematic depiction of a particular illustrative embodiment of the invention is schematic depiction of a particular illustrative embodiment of the invention showing a reel housing with a safety banner reel fully wound onto the reel and into the reel housing, wherein the safety banner comprises a strap and a plurality of flags attached to the strap and a hook attached to the distal end of the safety banner.

Turning now to FIG. 4 is schematic depiction of a particular illustrative embodiment of the invention is schematic depiction of a particular illustrative embodiment of the invention showing a reel housing 102 with a safety banner reel fully onto the reel and into the reel housing, wherein the safety banner comprises a strap and safety banners attached to the strap and a hook attached to the distal end 104 of the safety banner. An opening 115 is formed by the organizing guide 171. A pair of rollers 116 and 117 (show in FIG. 6B) is provided to align the flags and strap comprising the safety banner on the reel as the safety banner is reeled in through the organizing guide.

Figure 5:
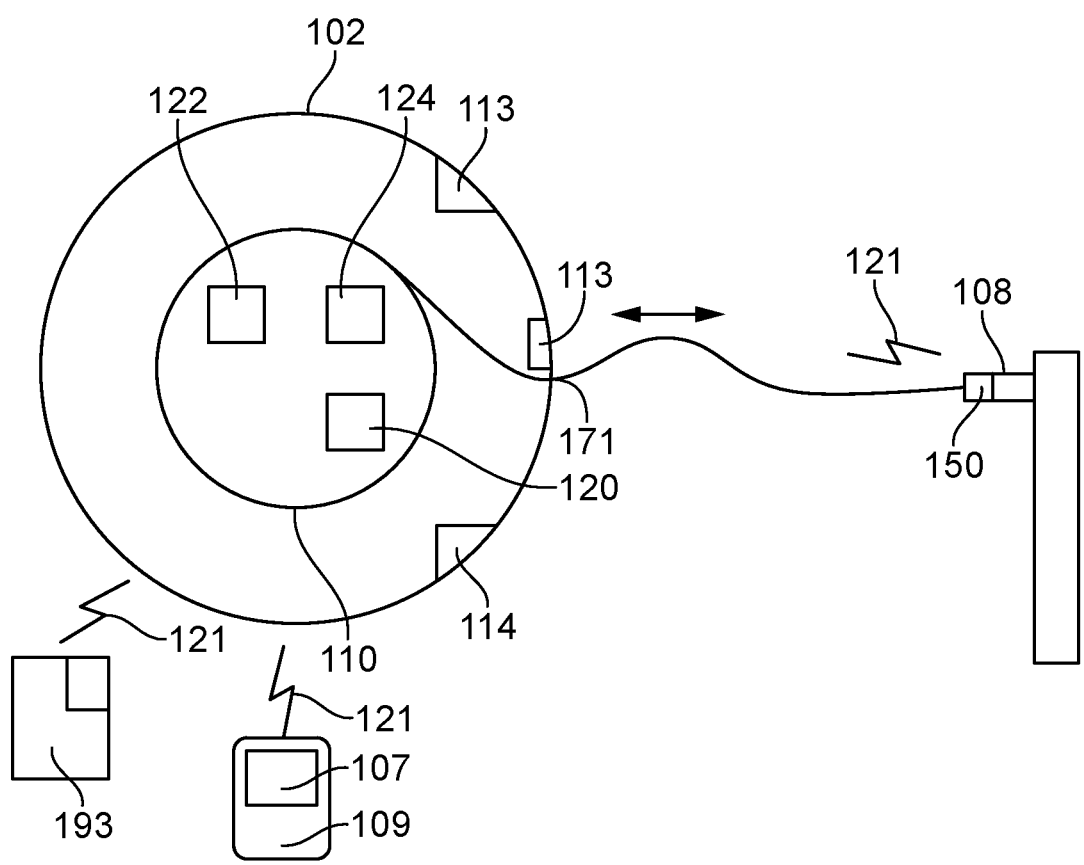
FIG. 5 is schematic depiction of a particular illustrative embodiment of the invention showing a processor, camera and tension sensor with battery power in the reel housing.

Turning now to FIG. 5 is schematic depiction of a particular illustrative embodiment of the invention showing a reel processor 120, computer readable medium 124, power supply 105, camera 113, light 114 and tension sensor 150 with a power supply 105 that supplies AC and battery power to the reel housing electronics. The tension sensor has a battery power supply. In another particular embodiment, a light emitting fiber is attached to the safety banner so that light is emitted from the safety banner when the light emitting is energized. A user pod 109 containing a user pod processor 107 with computer readable medium is provided to communicate with the reel processor 120 through a wireless connection 121 between the user pod processor and the reel processor. A security monitoring system 193 is provided to monitor the video camera, safety banner deployment and tension event alerts from the reel processor. A WIFI connection 121 is provided on the tension sensor 150, reel housing reel processor 120 and security monitoring system 193 to provide exchange of data between the tension sensor 150, reel housing reel processor 120 and security monitoring system 193.

Figure 6A:
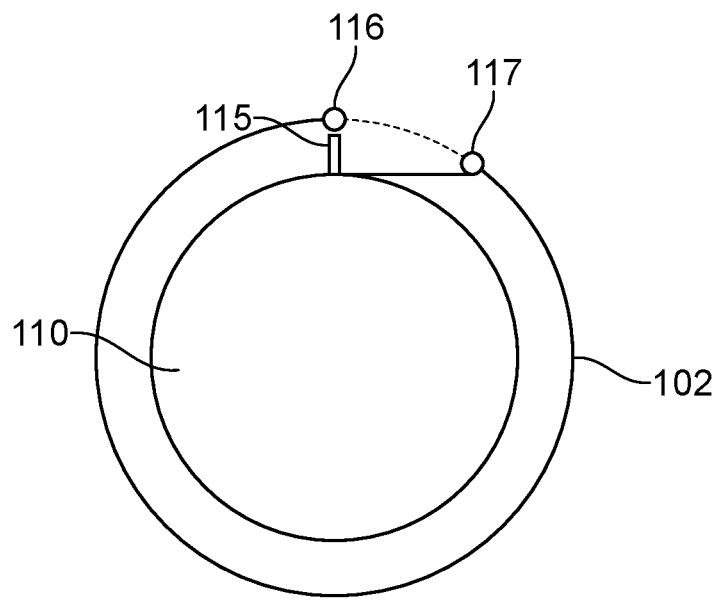
FIG. 6A is a side view of a particular illustrative embodiment of the invention, a first roller and a second roller are placed at each end of an opening that is formed in the reel housing as an organizing guide, which is also referred to herein as an organizing trough.
Figure 6B:
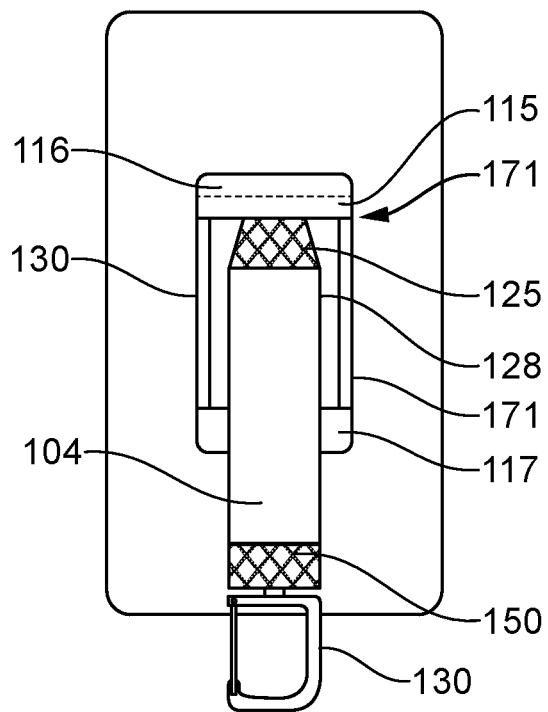
FIG. 6B is a front view of a particular illustrative embodiment of the invention, of the reel housing and opening and organizing guide walls. The strap has banner stop plug attached to stop the strap from entering the reel housing and a tension meter on the distal end of the strap adjacent a hook.

Turning now to FIG. 6A, as shown in FIG. 6A, in a particular illustrative embodiment of the invention, a first roller 116 and a second roller 117 are placed at each end of an organizing guide 171 (having an opening 115 formed in the organizing guide) also referred to herein as an organizing trough 171 as shown in FIG. 6A. As shown in FIG. 6A the safety banner is reeled in and onto the reel through the organizing guide 171 between the upper roller 116 and the lower roller 117 through the opening 115 form in the organizing guide 171 formed in reel housing 102. As shown in FIG. 6B, a front view of the reel housing 102 and opening 115 and organizing guide walls 128 and 130. The safety banner strap 104 has banner stop plug 125 attached to stop the distal end of the strap to keep the distal end of the strap from entering the reel housing. In another particular illustrative embodiment of the invention, a tension meter 150 is attached on the distal end of the strap adjacent a hook 130.

Figure 7A:
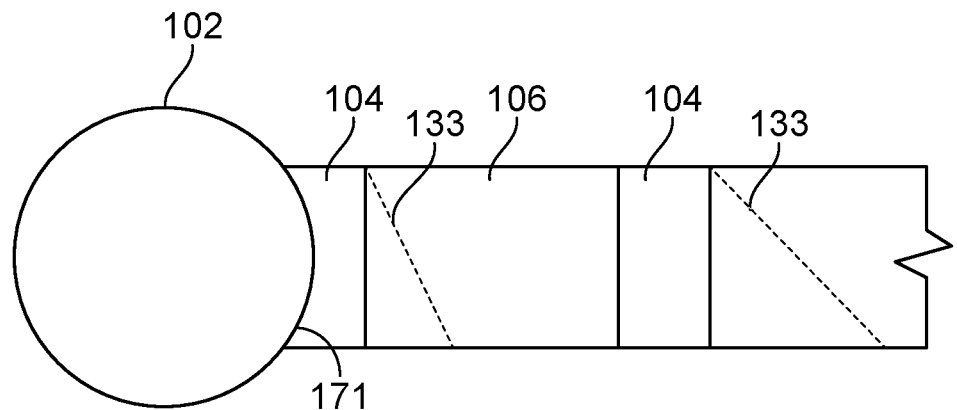
FIG. 7A is a bottom view of a particular illustrative embodiment of the invention, of the safety banner showing a plurality of 10-inch flags sewn to the strap at a 45 degree angle relative to a longitudinal axis for the strap and flags when the 10-inch flags are laid flat on the strap at 12-inch intervals.
Figure 7B:
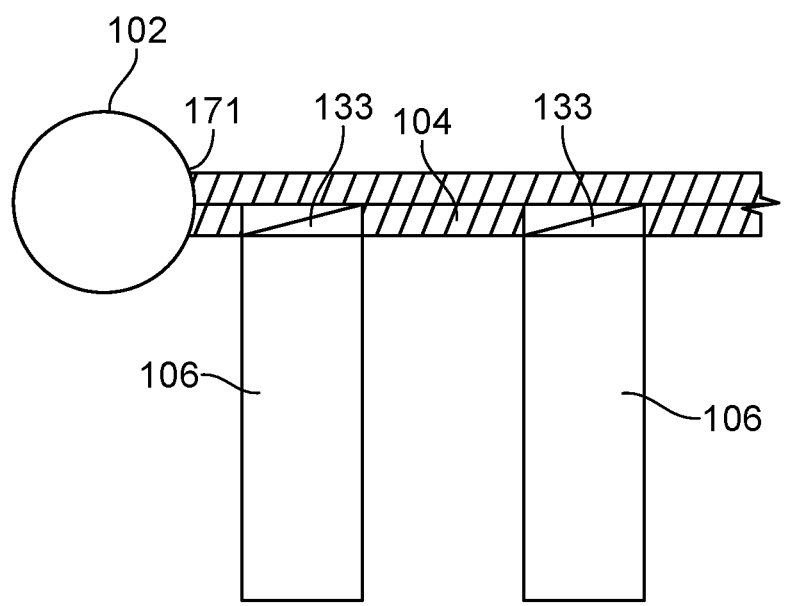
FIG. 7B is a side view of a particular illustrative embodiment of the invention, of the safety banner showing a plurality of 10-inch flags sewn to the strap at a 45 degree angle relative to a longitudinal axis for the flags wherein the strap is deployed horizontally so that the flags hang vertically down at a 90 degree angle from the strap.

Turning now to FIG. 7A, a bottom view of the safety banner showing a plurality of 10 inch flags 106 sewn to the strap 104 at a 45 degree angle 133 relative to a longitudinal axis for the flags laid flat on the strap at 12-inch intervals reeled out of the reel housing 102. Turning now to FIG. 7B, a side view of the reel housing 102 and safety banner showing a plurality of 10-inch flags 106 sewn to the strap 104 at a 45-degree angle 133 relative to a longitudinal axis for the flags wherein the strap is deployed horizontally so that the flags hang vertically down from the bottom surface of the strap at a 90 degree angle from the strap.

Figure 8A:
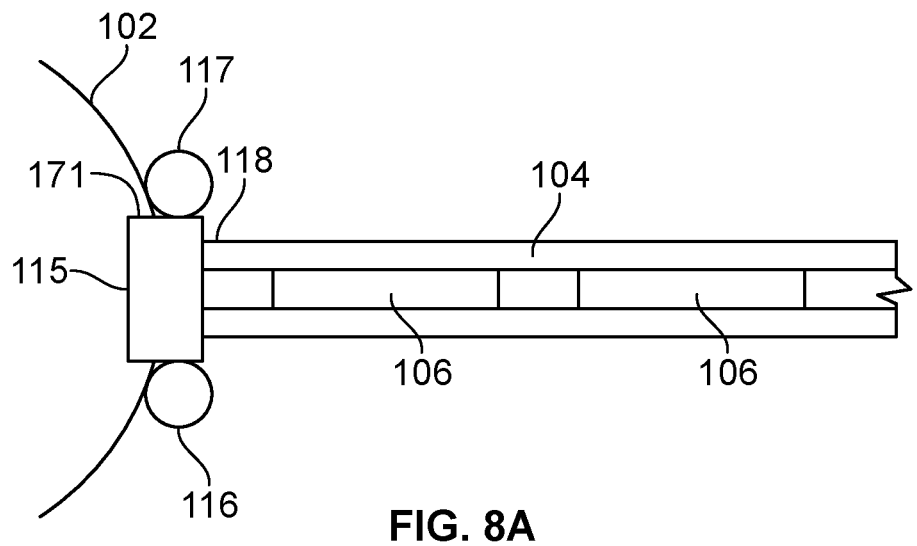
FIG. 8A is a side view of a particular illustrative embodiment of the invention, of the flags laid flat underneath the strap.
Figure 8B:
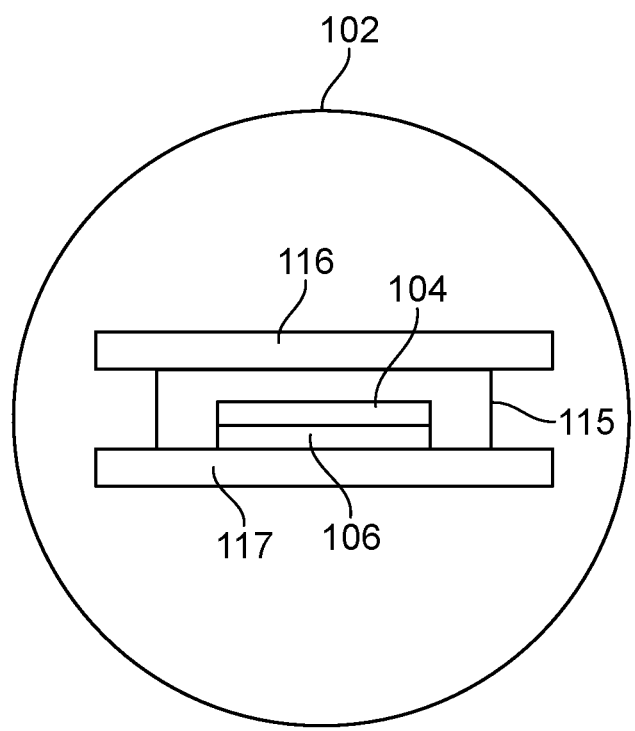
FIG. 8B is an end view of a particular illustrative embodiment the opening under roller is 20% wider than the ¼ combined thickness of the inch strap and flag and 20% longer that the one wide strap and flag.

Turning now to FIG. 8A, a side view of the flags 106 laid flat underneath the strap 104. In the present example, the strap is ⅛ inch thick and one inch wide and the flag is ⅛ thick and one inch wide. The strap and flags enter and exit the reel housing though opening 115 in the organizing guide 171. The combined thickness of the strap and flag laid flat on top of the strap is ¼ inch. The width of the safety banner strap and flags is one inch, as the strap and flags are aligned longitudinally by the organizing guide as the safety banner strap and flags enter the reel housing through the organizing guide. As shown in FIG. 8B, in a particular illustrative embodiment of the invention, the organizing guide 171 has an opening 115 under roller 116 is 20% wider than the ¼ combined thickness of the inch strap and flag and 20% longer that the one wide strap and flag, or 1.2 inches. In another particular illustrative embodiment of the invention the opening 115 in the organizing guide between the rollers 116 and 117 on the organizing guide is 3 inches long and 1.1 inches wide. In another particular embodiment of the invention the dimensions of the organizing guide are adjusted to accommodate differing strap and flag widths and thicknesses. The mesh forming the flags has free bending radius of 45 degrees so that wind can only bend the flags 45 degrees, but the flags are flexible enough to bend around the reel easily. The free bending radius is the degree of deflection over the length of the 10-inch flag under its own weight when the flag held upright and vertical. Thus, the flags are flexible enough to wind onto the reel but are not susceptible to wrapping around the strap when subjected to wind.

Figure 9:
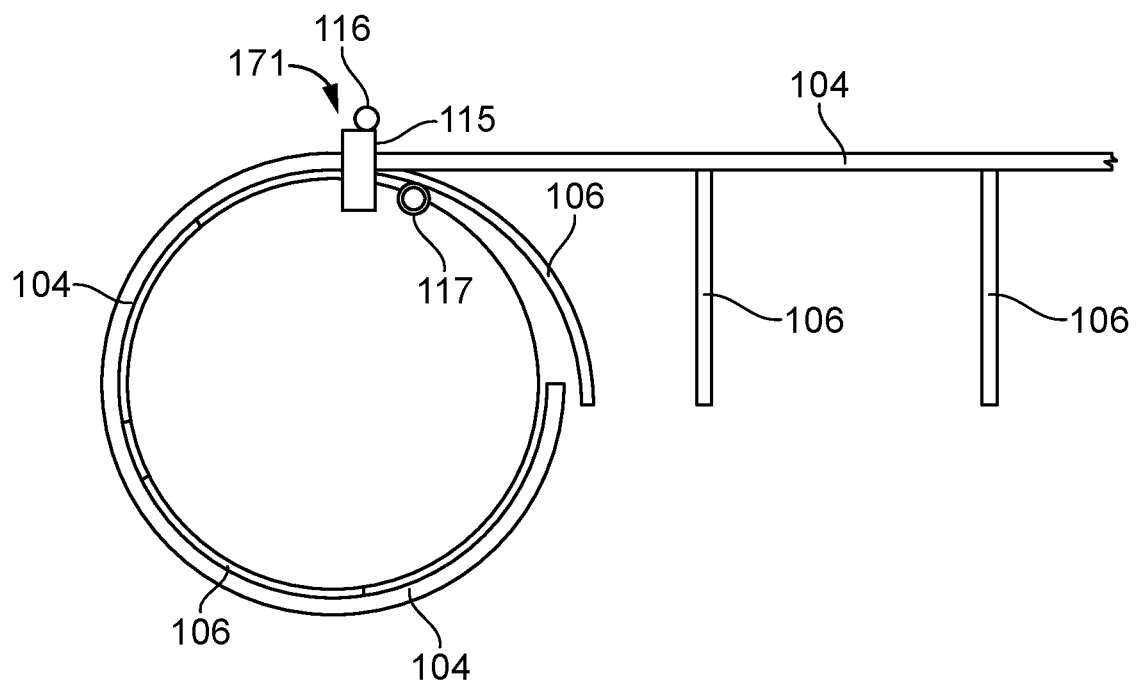
FIG. 9, in a particular illustrative embodiment the flags are reeled into the reel housing underneath the section of strap wherein a flag entering an opening and organizing guide between two rollers.

Turning now to FIG. 9, in another particular illustrative embodiment of the invention, the flags 106 are reeled into the reel housing underneath the section of strap 104 wherein a flag entering the opening 115 and organizing guide 171 between rollers 116 and 117. The organizing guide causes the flags to align longitudinally with the strap edges and underneath the strap on the reel as the strap and flags are reeled onto the reel. The organizing guide aligns the edges of the flags with the edges of the strap so that the width of the flags substantially matches the width of the strap when reeled onto the reel.

The organizing guide 171 is formed in the reel housing, wherein the organizing guide has two side walls 128 and 130 adjacent a bottom surface, and an opening in organizing guide, wherein the distance between the two side walls is 10% wider than the one inch width of the safety banner strap and flags, or 1.1 inches. The reel housing further includes but is not limited to a first roller at a first end of the organizing guide opening, wherein the safety banner strap and flags pass under the first roller and through the opening in the organizing guide. In another particular embodiment of the invention, a distance between the two side walls adjacent the bottom is 10% wider than the width of the safety banner strap and flags. In another particular illustrative embodiment of the invention a second roller at a second end of the organizing guide wherein the safety banner passes over the second roller and through the opening. In another particular illustrative embodiment of the invention, the opening is 3 inches long between the first and second roller. In another particular illustrative embodiment of the invention, the opening is 3/8 inches long between the first and second roller.

Figure 10:
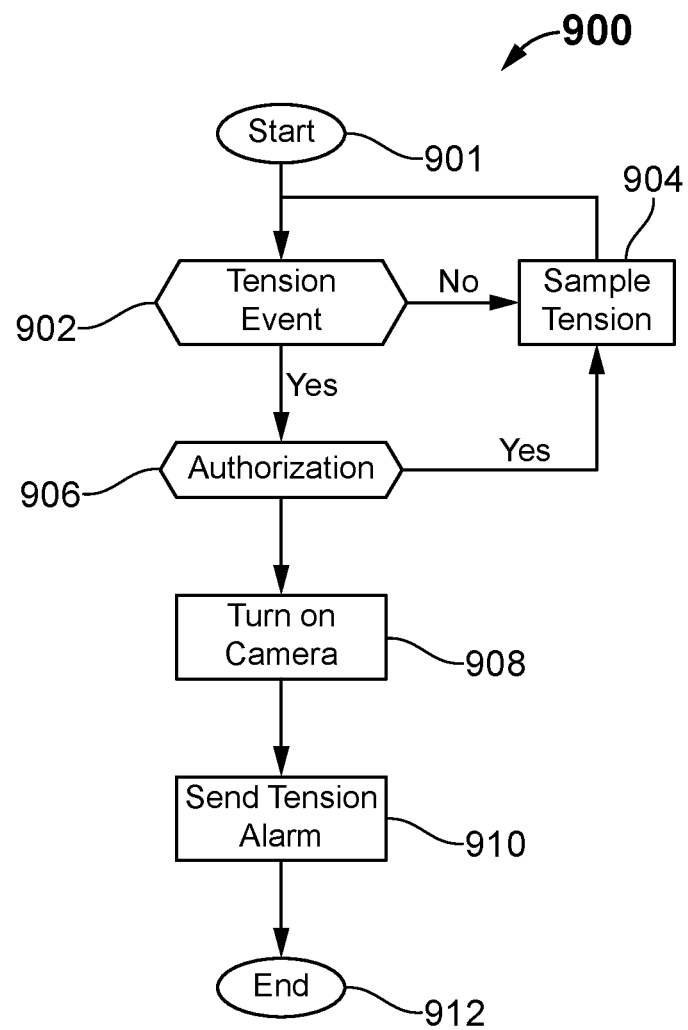
FIG. 10, in a particular illustrative embodiment a flow chart is shown for functions performed by a computer program.

Turning now to FIG. 10, a flow chart for computer functions performed by a computer program in a particular illustrative embodiment of the invention. As shown in the flow chart the computer program starts at 901. At 902 the processor determines if a tension event is has occurred and thus determined by the processor as to whether a tension event is present or not. A tension event is programmable as discussed above. One or more tension events can be programmed and detected, as describe above, by programming a change in droop tension (increase or decrease in droop tension) and a duration for the change in droop tension. If a tension event is not detected, the processor samples the tension again at 904. If a tension event is detected, the processor determines if an authorization code has been entered by a user at a user pod at 906. A user enters an authorization code to take down the safety banner or raise up by pulling on the safety banner to allow a vehicle under the safety banner and through the road way without causing the processor to sense an unauthorized tension event. If an authorization has been entered, the processor senses the tension and the tension meter is sampled again at 904. In another particular illustrative embodiment of the invention the tension sensor is attached to the safety banner at the reel housing. In another particular illustrative embodiment of the invention, the user pod is built into the safety reel housing. If no authorization code has been entered, and the processor determines that a tension event has occurred turns on the video camera to take video of the safety banner at 906 and sends a tension alarm at 910 to the security monitoring system. The process ends at 912 and is restarted at 901 after termination.

In a particular illustrative embodiment of the invention, a retractable safety banner system is disclosed, the system including but not limited to, a reel housing; a reel inside of the reel housing; and a safety banner comprising a strap with safety flags are attached to the strap wherein the safety banner is wound onto and off of the reel. In another particular illustrative embodiment of the invention, the reel housing further includes but is not limited to an organizing guide that is formed in the reel housing, wherein the organizing guide has two side walls adjacent a bottom surface, an entry facing and an opening in the entry facing, wherein the distance between the two side walls is 10% wider than the width of the safety banner strap and flags.

In another particular illustrative embodiment of the invention, the reel housing further includes but is not limited to a first roller at a first end of the organizing guide wherein the safety banner passes under the first roller and through the opening. In another particular illustrative embodiment of the invention, a distance between the two side walls adjacent the bottom is 10% wider than the width of the safety banner strap and flags. In another particular illustrative embodiment of the invention, the reel housing further includes but is not limited to a second roller at a second end of the organizing guide wherein the safety banner passes over the second roller and through the opening. In another particular illustrative embodiment of the invention, the strap is wound onto the reel on top of the flags so that the strap is on top and the flags hang from the bottom of the strap when the strap and flags are deployed horizontally as a safety banner.

In another particular illustrative embodiment of the invention, the strap is wound onto the reel on top of the flags for storage so that the strap is on top of a flag attached to strap at each of a plurality of one foot sections of strap, so that when the strap is reeled out as a safety banner, the flags hang down from the bottom of the section of strap to which the flag is attached, when the strap and flags are wound off of the reel deployed horizontally as a safety banner. In another particular illustrative embodiment of the invention, the safety banner comprises a plurality of strap sections with a flag attached to each section, wherein a length of the flag is shorter than a strap section, so that adjacent flags do not overlap when reeled on to the reel. In another particular illustrative embodiment of the invention, when safety banner is wound onto the reel, each section of safety banner comprising a 12 inch section of strap with a 10 inch flag attached to one end of the section of strap, so that on section of strap to which each top of the flags so that the strap is on top and the flags hang from the bottom of the strap when the strap and flags are deployed horizontally as a safety banner.

In another particular illustrative embodiment of the invention, the reel housing further includes but is not limited to a processor; and a tension sensor that measures tension on a deployed safety banner, wherein the processor determines a tension event when a tension on the safety banner is increased without authorization. In another particular illustrative embodiment of the invention, the reel housing further includes but is not limited to a processor; and a tension sensor that measures tension on a deployed safety banner, wherein the processor determines a tension event when a tension on the safety banner is increased without authorization. In another particular illustrative embodiment of the invention, the reel housing further includes but is not limited to a video camera that captures video of the safety banner, wherein the processor activates the video camera when a tension event is detected. In another particular illustrative embodiment of the invention, the reel housing further includes but is not limited to a light that shines on the safety banner, wherein the processor activates the light when a tension event is detected.

In another particular illustrative embodiment of the invention, wherein the processor sends an alert to a security monitoring system when a tension event is detected by the processor. In another particular illustrative embodiment of the invention, a method is disclosed for deploying a retractable safety banner; the method including but not limited to winding out a safety banner from a reel inside of a reel housing, wherein safety banner comprises a strap having a plurality of strap sections, wherein the strap sections are longer than a flag attached to each strap section, wherein the safety banner is stored on the reel inside of the reel housing; winding in the safety banner through an organizing guide formed in the reel housing; and aligning the flags and strap in an organizing guide so that the flags are aligned along the longitudinal axis of the strap so that the safety banner is stored on the reel with the flag under the section of strap on the reel.

In another particular illustrative embodiment of the invention, a computer readable medium is disclosed containing a computer program that is executed by a processor on a reel housing: a processor that executes the computer program, the computer program comprising: instructions to detect on the processor, a tension event by sensing on a tension meter for tension on a deployed safety banner that has been reeled out of a reel housing, wherein a tension event is a change in tension on the safety banner; and when a tension event is detected, instructions to send an alarm to a security monitoring service. In another particular illustrative embodiment of the invention, the computer readable medium further includes but is not limited to instructions to send an alarm further comprise instructions to activate a video camera that takes a video of the safety banner.

In another particular illustrative embodiment of the invention, the computer readable medium further includes but is not limited to instructions to send an alarm further comprise instructions to activate a light that shines light on the safety banner. In another particular illustrative embodiment of the invention, the computer readable medium further includes but is not limited to instructions to determine a droop tension of a deployed safety banner, wherein a tension event is defined a 10% deviation from the droop tension. The droop tension, as discussed above, is measured for the safety banner for a period of 5 seconds when deployed and the reel is in a locked ratcheted state. The droop tension is programmable and is increased or decrease by wind is varying the tension of the deployed safety banner.

In another particular illustrative embodiment of the invention, the computer program further comprises instructions to determine a droop tension of a deployed safety banner, for a period of 20 seconds, wherein a tension event is defined a 25% deviation from the droop tension measured for 5 seconds and an event duration of 2 seconds.

The present inventions can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general-purpose computer system with a computer program that, when being loaded and executed, controls the computer system such that it carries out the methods and inventions described herein.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. The flow chart is an example only and the steps shown in the flow chart need not be executed in the exact order shown on the flow chart. Moreover, some of the steps in the flow chart can be left out in performing the system and method of the present invention. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow chart. Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of the networks known. A diagram is shown illustrating an example of a computer that may be used in connection with the present inventions. The computer may include at least one processor and at least one memory, each of which may be coupled to a local interface or bus. An operating system may be stored in the memory and executable by the processor. Any variety of software programs may also be stored in the memory and executable by the processor. In a specific embodiment, examples of programs that may be stored in the memory and executable by the processor. A media player application may be stored in the memory and executable by the processor. Also stored in the memory may be various forms of data. The term "executable" as used herein means that a program file is of the type that may be run by the processor. In specific embodiments, examples of executable programs may include without limitation: a compiled program that can be translated into machine code in a format that can be loaded into a random access portion of the memory and run by the processor; source code that may be expressed in proper format such as object code that is capable of being loaded into a random access portion of the memory and executed by the processor; or source code that may be interpreted by another executable program to generate instructions in a random access portion of the memory to be executed by the processor. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The memory may include both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random-access memory (SRAM), dynamic random-access memory (DRAM), or magnetic random-access memory (MRAM) and other such devices. The ROM may comprise, for example, a programmable read-only memory (PROM), an erasable programmable read-only memory (EPROM), an electrically erasable programmable read-only memory (EEPROM), or other like memory device. In a specific embodiment, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories. The local interface may comprise additional systems designed to coordinate this communication, including, for example, performing load balancing. The processor may be of electrical or of some other available construction. Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein. The flowchart shows the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s). Although the flowchart shows a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in FIG. 2, may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions. Any logic or application described herein that comprises software or code can be embodied in any non-transitory computer-readable medium, such as computer-readable medium, for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present inventions, a "computer-readable medium" may include any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random-access memory (SRAM) and dynamic random-access memory (DRAM), or magnetic random-access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device. The computer may further include a network interface coupled to the bus and in communication with a network. The network interface may be configured to allow data to be exchanged between computer and other devices attached to the network or any other network or between nodes of any computer system or the video system. In addition to the above description of the network, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. The computer may also include an input/output interface coupled to the bus and also coupled to one or more input/output devices, such as a display, a touchscreen, a mouse or other cursor control device, and/or a keyboard. In certain specific embodiments, further examples of input/output devices may include one or more display terminals, keypads, touchpads, scanning devices, voice or optical recognition devices, or any other devices suitable for entering or accessing data by one or more computers. Multiple input/output devices may be present with respect to a computer or may be distributed on various nodes of computer system, the system and/or any of the viewing or other devices. In some embodiments, similar input/output devices may be separate from the computer and may interact with the compute or one or more nodes of computer system through a wired or wireless connection, such as through the network interface. It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A retractable safety banner system, the system comprising:
    a reel housing;
    a reel inside of the reel housing; and
    a safety banner comprising a strap with flags, wherein the flags are configured to extend downward past a lower edge of the strap and hang perpendicularly from the strap when the strap is unwound off the reel,
    an organizing guide in the reel housing, wherein the flags are aligned along the longitudinal axis of the strap so that the safety banner is stored on the reel with the flag section of strap to which it is attached, wherein the flags are attached to a bottom surface of the strap, wherein the safety banner is wound onto and off of the reel; and
    a processor; and
    a tension sensor that measures tension on a deployed safety banner, wherein the processor determines a tension event when a tension on the deployed safety banner changes.

2. The system of claim 1, the system further comprising: wherein the processor determines a tension event when a tension on the safety banner is increased.

3. The system of claim 1, the system further comprising: a video camera that captures video of the safety banner, wherein the processor activates the video camera when a tension event is detected.

4. The system of claim 1, the system further comprising: a light that shines on the safety banner, wherein the processor activates the light when a tension event is detected, wherein a tension event is a percentage change in a droop tension and a duration for the tension event.

5. The system of claim 1, wherein the processor sends an alert to a security monitoring system when a tension event is detected by the processor.

6. The system of claim 1, wherein
    the organizing guide that is formed in the reel housing, wherein the organizing guide has two side walls and an opening, wherein the distance between the two side walls is 10% wider than the width of the safety banner strap and flags.

7. The system of claim 6, wherein the reel housing further comprises:
    a first roller at a first end of the organizing guide wherein the safety banner passes under the first roller and through the opening.

8. The system of claim 7, wherein the reel housing further comprises:
    a second roller at a second end of the organizing guide wherein the safety banner passes over the second roller and through the opening.

9. The system of claim 8, wherein a distance between the two rollers 10% wider than a combined thickness of the strap and flags.

10. The system of claim 7, and wherein the flags are configured so that when the safety banner is wound onto the reel so that the strap is positioned parallel to and on top of the flags when strap is wound onto the reel and so that the strap is on top and the flags hang perpendicular to and from the bottom surface of the strap when the strap is deployed horizontally as a safety banner.

11. The system of claim 10, wherein the strap is wound onto the reel on top of the flags for storage so that the strap is on top of the flag attached to strap at each of a plurality of one foot sections of the strap, so that when the strap is reeled out as a safety banner, the flags hang down perpendicularly from the bottom of the section of the strap to which the flag is attached, when the strap and flags are wound off of the reel deployed horizontally as a safety banner.

12. The system of claim 10, wherein the strap comprises a plurality of strap sections with one end of each of one the flag attached to each section, wherein a length of the flag is shorter than a strap section, so that adjacent flags do not overlap each other when the flags and strap are reeled on to the reel.

13. The system of claim 12, wherein when safety banner is wound onto the reel, each section of safety banner comprising a 12 inch section of strap with a 10 inch flag attached to one end of the section of strap, so that on section of strap to which each top of the flags so that the strap is on top and the flags hang from the bottom of the strap when the strap and flags are deployed horizontally as a safety banner.

14. A method for deploying a retractable safety banner;
    winding out the safety banner from a reel inside of a reel housing, wherein the safety banner comprises a strap having a plurality of strap sections, wherein the strap sections are longer than a flag attached to a bottom surface of each strap section, wherein the flags are configured to extend downward past a lower edge of the strap sections and hang perpendicularly from the strap sections when the strap sections are unwound off the reel, wherein the safety banner is stored on the reel inside of the reel housing;
    winding in the safety banner through an organizing guide formed in the reel housing; and
    aligning the flags and strap in the organizing guide so that the flags are aligned along the longitudinal axis of the strap so that the safety banner is stored on the reel with the flag section of strap to which it is attached; and
    sensing a tension event from a tension sensor that measures tension on a deployed safety banner, wherein a processor determines a tension event when a tension on the deployed safety banner is changed.

* * * * *